(12) United States Patent
Servi et al.

(10) Patent No.: US 6,314,293 B1
(45) Date of Patent: Nov. 6, 2001

(54) PROBABILISTIC USE OF WIRELESS RESERVE CHANNELS FOR ADMISSION CONTROL

(75) Inventors: Leslie D. Servi, Lincoln, MA (US); Daryl J. Daley, Reid A.C.T. (AU); Gregory A. Greene, Sr., Seffner, FL (US); William E. Hogg, Valrico, FL (US); Michael Nail, Lutz, FL (US)

(73) Assignees: Verizon Laboratories Inc., Waltham, MA (US); GTE Wireless Incorporated, Alpharetta, GA (US)

( * ) Notice: Subject to any disclaimer, the term of this patent is extended or adjusted under 35 U.S.C. 154(b) by 0 days.

(21) Appl. No.: 09/491,669

(22) Filed: Jan. 27, 2000

(51) Int. Cl.$^7$ .................................................. H04Q 7/20
(52) U.S. Cl. .................... 455/450; 455/452; 455/453; 455/509; 455/422; 379/133; 379/134
(58) Field of Search ................... 455/67.1, 422, 455/453, 560, 509–514, 450, 452; 379/111, 133, 134

(56) References Cited

U.S. PATENT DOCUMENTS

| | | | |
|---|---|---|---|
| 5,283,788 | * 2/1994 | Morita et al. ..................... | 370/110.1 |
| 5,448,750 | * 9/1995 | Ericksson et al. ................. | 455/33.1 |
| 5,497,504 | * 3/1996 | Acampora et al. ................ | 455/33.2 |
| 5,615,255 | * 3/1997 | Lemieux ............................ | 379/230 |
| 5,970,064 | * 10/1999 | Clark et al. ....................... | 370/351 |
| 5,991,622 | * 11/1999 | Henry, Jr. ......................... | 455/434 |
| 6,014,567 | * 1/2000 | Budka ............................... | 455/453 |
| 6,023,248 | 2/2000 | Lenormand et al. .............. | 343/779 |
| 6,035,207 | * 3/2000 | Wang et al. ....................... | 455/509 |
| 6,041,231 | * 3/2000 | Suzuki .............................. | 455/422 |
| 6,052,596 | * 4/2000 | Barnickel .......................... | 455/450 |
| 6,097,733 | * 8/2000 | Basu et al. ........................ | 370/468 |
| 6,157,839 | * 12/2000 | Cerwall et al. ................... | 455/450 |
| 6,192,249 | * 2/2001 | Padovani ........................... | 455/453 |

OTHER PUBLICATIONS

N.K. Jaiswal, Priority Queues, Academic Press (New York), 1968, p. 204–214.

* cited by examiner

Primary Examiner—William Trost
Assistant Examiner—Marceau Milord
(74) Attorney, Agent, or Firm—James K. Weixel

(57) ABSTRACT

A method for controlling the admission of a call into a service area. The method includes the steps of selecting a non-negative integer N; selecting a real number p, lying between 0 and 1 inclusive; admitting a call when N–2 or fewer channels are occupied; blocking the call with a probability p when N–1 channels are occupied; and blocking the call when N or more channels are occupied.

29 Claims, 5 Drawing Sheets

| | number of hand in calls per minute 418 | number of new calls per minute 416 | $N_{tot}$ 412 | hand in call blocking probability (%) (methods III, IV) 410 | new call blocking probability (%) (method III) 408 | new call blocking probability (%) (method IV) 406 | N 404 | p 402 | new call and hand-in call blocking probability (%) (method I) 400 |
|---|---|---|---|---|---|---|---|---|---|
| 421 | 2 | 4 | 11 | 0.60 | 7.51 | 6.48 | 10 | 0.358 | 2.30 |
| 422 | 5 | 10 | 18 | 3.84 | 14.46 | 13.26 | 18 | 0.866 | 8.62 |
| 423 | 5 | 10 | 21 | 1.18 | 6.37 | 5.46 | 21 | 0.951 | 3.15 |

Test Results of Performance of Models I, III and IV

FIG. 4

PROBABILISTIC USE OF WIRELESS RESERVE CHANNELS FOR ADMISSION CONTROL

BACKGROUND OF THE INVENTION

A. Field of the Invention

The present invention relates generally to communications systems. More particularly, this invention relates to the management of traffic in a wireless communication system by the probabilistic use of reserve channels.

B. Description of the Related Art

FIGS. 1A and 1B illustrate two widely used cell patterns in a cellular telephony system. It is important to mention that the boundaries of each cell vary in reality, since they are defined by the radiation patterns of antennas corresponding to base stations in each cell (not shown). That is, the hexagonal shape of the cells represents an ideal concept that cannot be achieved when implementing the cellular telephony system.

Each base station (not shown) in a cell is assigned a number of channels (frequency channels are generally used in an analog cellular system while time slots could be used in a digital cellular system) for use by a group of mobile stations, being serviced by the base stations, in order to establish a communication link between the mobile stations and each base station. The communications link is used to establish a call between a mobile station and telephone terminal. The telephone terminal can be either a computer (via modem), a conventional telephone or another mobile station located either in the wireless communications system/network or being part of a conventional telephony network. A mobile station is a communication unit in the mobile communication system (e.g., cellular radio system) that is intended for use while it moves at unspecified locations. A mobile station is typically either a hand-held unit (portable telephone) or a mobile unit installed in a vehicle. FIG. 2 shows base stations 204 and 206, each covering a different cell, as well as a hand-held unit 214 and a mobile unit 208.

The number of base stations per cell can be adjusted to comport with system design specifications such as the amount of traffic handled on a per cell basis, and signal to co-channel and signal to adjacent channel interference ratios. One technique that enables the use of multiple base stations in a given cell is called sectoring. FIG. 1A shows an example of cells 104 partitioned into three sectors. A base station (not shown) is placed in each of the three sectors in this figure. The sectoring pattern shown in FIG. 1A is known as 120 degree sectoring. Likewise, FIG. 1B shows cells 106 which are partitioned into six sectors, with each sector having a base station that covers the area defined by the sector. This second sectoring pattern is known as a 60 degree sectoring.

In a cell pattern such as that shown either in FIGS. 1A or 1B, a given cell is assigned a number of channels, regardless of whether the cell has been sectored or not. When a cell is partitioned into sectors, each sector is assigned a subset of the channels that correspond to the cell, each channel subset being different for each sector. That is, if 12 channels are assigned to each cell 102 in the system of FIG. 1A, then each sector in the partitioned cells 104 might support 4 channels. Under similar circumstances, the cells 106 that are partitioned into sectors as shown in FIG. 1B have 12 channels to split among 6 sectors. Hence, each sector in cells 106 might support 2 channels. The important concept to keep in mind is that each sector has a collection of channels associated to it.

FIG. 2 illustrates a conventional hand-in process occurring in a cellular system environment. The system has been simplified by illustrating only two cells that are not partitioned in sectors. The system includes a mobile switching center (MSC) 218, two base stations 204 and 206, a mobile unit 208, and a hand-held unit 214. The function of a MSC 218 is to coordinate the routing of calls in a large area serviced by the mobile communications system. That is, the area for which radio coverage is provided by a group of base stations associated with the MSC 218. In a cellular radio system, the MSC 218 connects the cellular base stations and the mobiles (or hand-held units) to the Public Switched Telephone Network (not shown). FIG. 2 only shows a portion (i.e., two cells) of the service area supported by the MSC 218.

The MSC 218 may manage admission of calls into each cell. Namely, a call is given or denied access to a channel of the channel assigned to each base station when the mobile unit enters an area in the cell corresponding to that base station. A person of ordinary skill would recognize that base stations may also manage the admission of calls into each cell. For different types of traffic, originating either from mobiles 208 or hand-held units 214, the MSC prioritizes the assignment of a channel to a call requesting a channel. The prioritization depends on the type of call rather than the type of equipment (mobile unit or hand-held unit) from which the call originates. Also, not all MSC's implement a call prioritization procedure, as will be discussed below.

Two common traffic types are hand-in traffic and new traffic. Hand-in traffic refers to traffic that initiates from a mobile or hand-held unit in one sector of one cell and that subsequently would benefit from being handled by a different sector, either in the same cell or in another cell. This benefit might be due to an improved signal strength caused by the motion of the mobile or hand-held unit. On the other hand, new traffic refers to either traffic that is initiated by a caller in a cell (i.e., user of a mobile 208 or hand-held unit 214) and that was not previously handled by a different sector or cell, or to traffic initiated by other callers which call a mobile in the cell.

A "hand-in" includes the process of transferring a call from one sector in one cell, supported by a first base station, to another sector in the same cell, supported by a second base station. Also, the use of the term hand-in applies in the situation where the transfer is from one sector in one cell to another sector in another cell, the transfer from one cell to another, or more generally, the transfer from an area supported by a first set of channels, to another area supported by a second set of channels. In more practical terms, a hand-in occurs, for example, when a wireless telephone call established between a mobile user and another user is handled by a first base station, and then transferred and handled by a second base station within that call period, without an interruption in the call, where each base station uses a different set of channels to communicate with the mobile unit. The term "hand-in call" refers to a call that experiences a hand-in.

Because it is less desirable for users to have a telephone call terminated than to attempt to make a telephone call without success, hand-in calls are desirably given preference over new calls at the time of assigning a base station channel to the call. A hand-in process and the preferential treatment of hand-in calls is explained in further detail with reference to FIG. 2.

For simplicity's sake, FIG. 2 illustrates a hand-in process that transfers a mobile call from one cell to another. None of these cells 102 is partitioned into sectors.

It is assumed that a call from mobile 208 is in progress as the mobile 208 moves towards base station 206, and that the hand-in call is carried via a channel established between the mobile 208 and the base station 204. The MSC 218 monitors the signal power received from the mobile 208 on the channel supporting the call. Graph 200 illustrates the monitored signal power level of a signal received at base stations 204 and 206. These signal levels 201 and 202 correspond to the same signal, received at two different locations (i.e., base stations 204 and 206). Although both base stations receive the signal, only one base station handles the call being carried by the signal. The decision as to which station handles the call depends, among other things, on the signal power level received at each base station for the signal carrying the call.

As will become evident from the discussion below on the signal levels 201 and 202, the graph 200 represents that the signal level 201 constantly decreases as the mobile 208 moves away from the base station 204. Also, graph 200 represents that the signal level 202 increases as the mobile 208 moves towards base station 206. These two situations are simply a illustrations of a possible scenario. The graph 200 does not stand by the proposition that as a mobile 208 moves from a first base station to a second base station, the signal level received at the first base station constantly decreases (i.e., no sudden increase in signal level) and the signal level received at the second base station constantly increases.

In the example of FIG. 2, the mobile 208 is originally located in the cell being supported by base station 204. Accordingly, the signal level 201 corresponding to the signal received at base station 204 is considerably high when compared to the signal level 202 corresponding to the same signal as received by the base station 206. This first point of comparison is when the mobile passes through point 210 in the figure.

As the mobile 208 travels towards base station 206, as indicated by the arrow below the mobile 208, the signal level 201 received by the base station 204 starts to decrease. Conversely, the signal level 202 of the signal received by base station 206 increases. Consequently, the signal is received at both base stations at roughly the same power level 203 somewhere in between points 210 and 212, as the mobile travels from one point to the other.

The instance of time corresponding to the point 205 in graph 200, at which the power level 201 approaches a minimum signal level 203 required for proper communication between the mobile 208 and the base station 204, represents one possible scenario in which the MSC 218 conducts a hand-in. In the present example the hand-in occurs when the mobile travels through point 212 in the cell area corresponding to base station 206. The point 205 can be defined as the point where the signal level is above the minimum acceptable level 203 by a specific voltage or power level. In practice, there are several criteria, other than the setting of a threshold voltage above a minimum acceptable signal level, that might be used in the determination of when to perform the hand-in.

Turning now to the prioritization of calls, conventional methods of managing the admission of telephone calls to a cell serviced by a base station are presented here with reference to the hand-in process discussed above, the hand-in taking place at point 205 in graph 200, and with reference to a new call originating from a hand-held unit 214. In addition to this, the base station in which a call is admitted to or blocked from (by direction of the MSC 218) is base station 206.

A first method of controlling the admission of calls to the area covered by base station 206 is to make all of the channels assigned to that base station available to all arrivals. That is, the total number of channels assigned to the base station 206 is not split between reserve and non-reserve channels, as is the case with the two other methods for admission control that will be discussed below. An arrival refers either to a call involved in the hand-in process and attempting to obtain one channel from base station 206 in order to guarantee the continuity of the call, such as the hand-in call from mobile 208 discussed above, or to a call originating from either a mobile (not necessarily mobile 208) or a hand-held unit 214 in a radio coverage area supported by base station 206. In this situation, no priority is given to admission of calls on the basis of traffic type.

A second method of controlling the admission of calls to the area supported by base station 206, is to divide the total number of channels assigned to the base station 206 into reserve and non-reserve channels, and then to admit or block calls (hand-in or new) depending on the number of reserve and non-reserve channels unoccupied at the time of the arrival. The assignment of available channels is prioritized according to the type of calls arriving. More specifically, the second method consists of directing any hand-in calls to any unoccupied reserve channel. If there is no unoccupied reserve channel, the hand-in call is then directed to an unoccupied non-reserve channel. On the other hand, new calls arriving (originating) in the service area supported by base station 206 are admitted only if there is an unoccupied non-reserve channel.

The third method, like the second method, also divides the number of assigned channels into reserve and non-reserve channels. The admission control protocol for the third method differs from that of the second method. It consists of admitting any call to an unoccupied non-reserve channel. When there are no non-reserve channels unoccupied, only hand-in calls are directed to the reserve channels, and new calls are blocked. When no reserve or non-reserve channels are unoccupied, any arriving call will be blocked. As a result of this method, the hand-in traffic receives preferential treatment if the number of reserve channels is set to be greater than or equal to one.

The aforementioned conventional techniques for call admission control leave a cellular system designer with limited design options and results in system inefficiency. The ability to fine-tune the admission policy to a desired system performance goal is severely limited. Regarding the first method discussed, there are no parameters to tune, other than the total number of channels corresponding to a base station, since there are no reserve channels. Regarding the second and third methods, a well engineered 10 channel cell (or sector) having more than two reserve channels under a moderate to heavy traffic load would typically result in unacceptably poor performance for the new traffic and hence the designer is faced with only three alternatives, namely, (i) use no reserve channels, (ii) use one reserve channel, or (iii) use two reserve channels. Because each of the three alternatives results in significantly different performances (probability of a call being blocked) for the two classes of traffic (hand-in and new), other alternative admission policy is desirable.

Before proceeding, it is important to discuss some of the terminology used when considering the performance of wireless communications systems. First, it is important to distinguish between measured and modeled performances. Turning our attention first to measured performances, five main quantities are measured over a specified period of time (e.g., 4 hours), namely, the arrival rate of hand-in calls, the arrival rate of new calls, the user call duration, the blocking rate of hand-in calls and the blocking rate of new calls. The arrival rate of hand-in calls refers to the average number of hand-in calls arriving at a service area per unit of time (e.g., number of hand-in calls per minute), where the average is calculated over the time that the measurements are taken. Likewise, the arrival rate of new calls refers to the average number of new calls arriving at a service area per unit of time. The user call duration refers to the average time that an user spends on a telephone call.

The blocking rate of new and hand-in calls are the measurements that represent the quality of service (QOS) of the system. The blocking rate of new calls is measured by dividing the total number of new calls in a period of time that were unsuccessful in obtaining a channel in the service area of interest, by the total number of new calls that arrived at the service area (e.g., calls that obtained a channel plus calls that did not). The blocking rate of hand-in calls is measured in a similar fashion.

In order to improve the QOS of a system, the system designer can alter parameters in the system and monitor the system performance to see whether an improved QOS results from the changes in the design parameters. Measuring the arrival rates, etc., every time that a design parameter is changed in order to determine whether the change results in an improved QOS would impose a tremendous burden on the designer. Instead of actually measuring these figures in order to adjust the design parameters to achieve a predetermined performance, it is best to model the figures by using probabilistic distributions. The use of probabilistic models reduces the aforementioned burden by reducing the amount of time that a technician spends in the field taking the measurements.

Turning now our attention to the modeled system performances, the five quantities mentioned above are modeled via a computer simulation program, mathematical analysis or by any other computing means. The blocking probability predicts a blocking rate and refers to the percentage of attempts out of a total number of attempts that a call will be blocked, the call being either a hand-in call that will be interrupted or a new call that will not be admitted into the system. The computed blocking probability is determined by the offered load, the number of channels in the system whose quality is being predicted, and the underlying assumptions of traffic characteristics. The offered load represents the channel time utilization (the fraction of time that a channel is in use) in the aggregate. Traffic characteristics refer to the arrival process, service process and customer behavior characteristics of the system. The arrival process is used to model the arrival rates and refers to the assumption that within a certain period of time, a random number of telephone calls will attempt to get admitted into the system (obtain a channel) at random times. This random number follows a probabilistic distribution that might be assumed to be a Poisson distribution. The service process models the user call duration quantity discussed above, and simply refers to the duration of a call. Because the call duration varies for each call/user, the service process is characterized as a probabilistic distribution, plausibly an exponential distribution. The customer behavior characteristics (service process of the system) refer to the management of calls that attempt to get an unoccupied channel but find that all of the channels in the system are busy. For the present discussion, it will be assumed that any arrival finding no suitable free channel is blocked and lost.

Admission policies could be compared based on their respective efficiencies. That is, some admission policies that provide, for example, 2% blocking to new traffic will provide better or worse QOS to the hand-in traffic even under the same assumptions of the arrival process of calls and service process of the system. Alternatively, some admission policies that provide, say 2% blocking to hand-in traffic, will provide equivalent QOS for new traffic as another admission policy, but will require fewer channels. The best such system would be said to be the most efficient.

Therefore, there is a need in the art to provide preferential admission to hand-in traffic compared with new traffic using an admission policy that is efficient and can be fine-tuned to the performance goals of the system designer.

SUMMARY OF THE INVENTION

Accordingly, it is an object of the present invention to meet the foregoing needs by providing systems and methods for controlling the admission of a call into a service area.

Specifically, systems and methods for meeting the foregoing needs are disclosed. The method includes the steps of selecting a non-negative integer N; selecting a real number p, lying between 0 and 1 inclusive; admitting a call when $N-2$ or fewer channels are occupied; blocking the call with a probability p when $N-1$ channels are occupied; and blocking the call when N or more channels are occupied.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

FIG. 4 illustrates a table with results comparing the system efficiency achieved by using the admission control policy of the present invention versus the system efficiency achieved by using other conventional admission control policies.

DETAILED DESCRIPTION

Figure 1A:
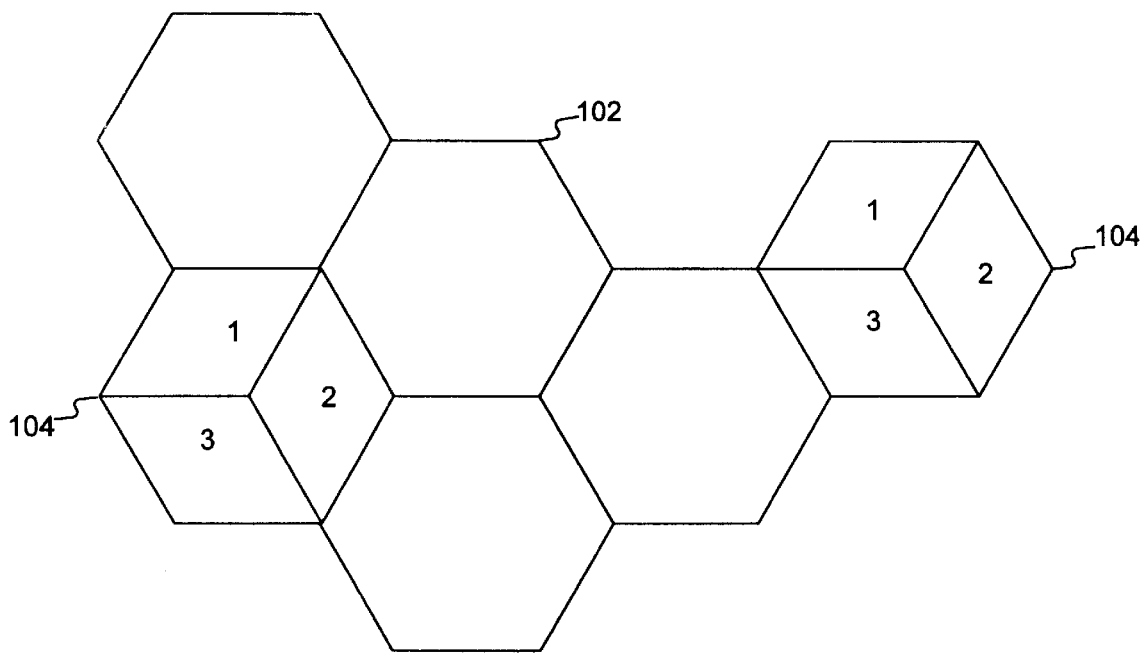
FIGS. 1A and 1B illustrate the sectoring of cells in a cellular telephony system.
Figure 1B:
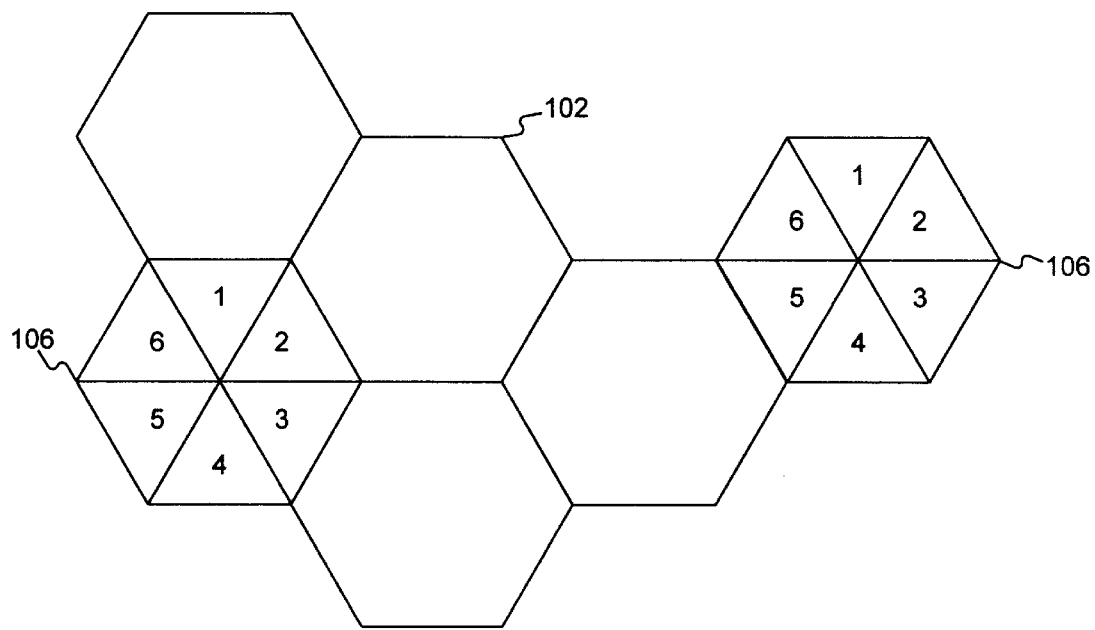
Figure 2:
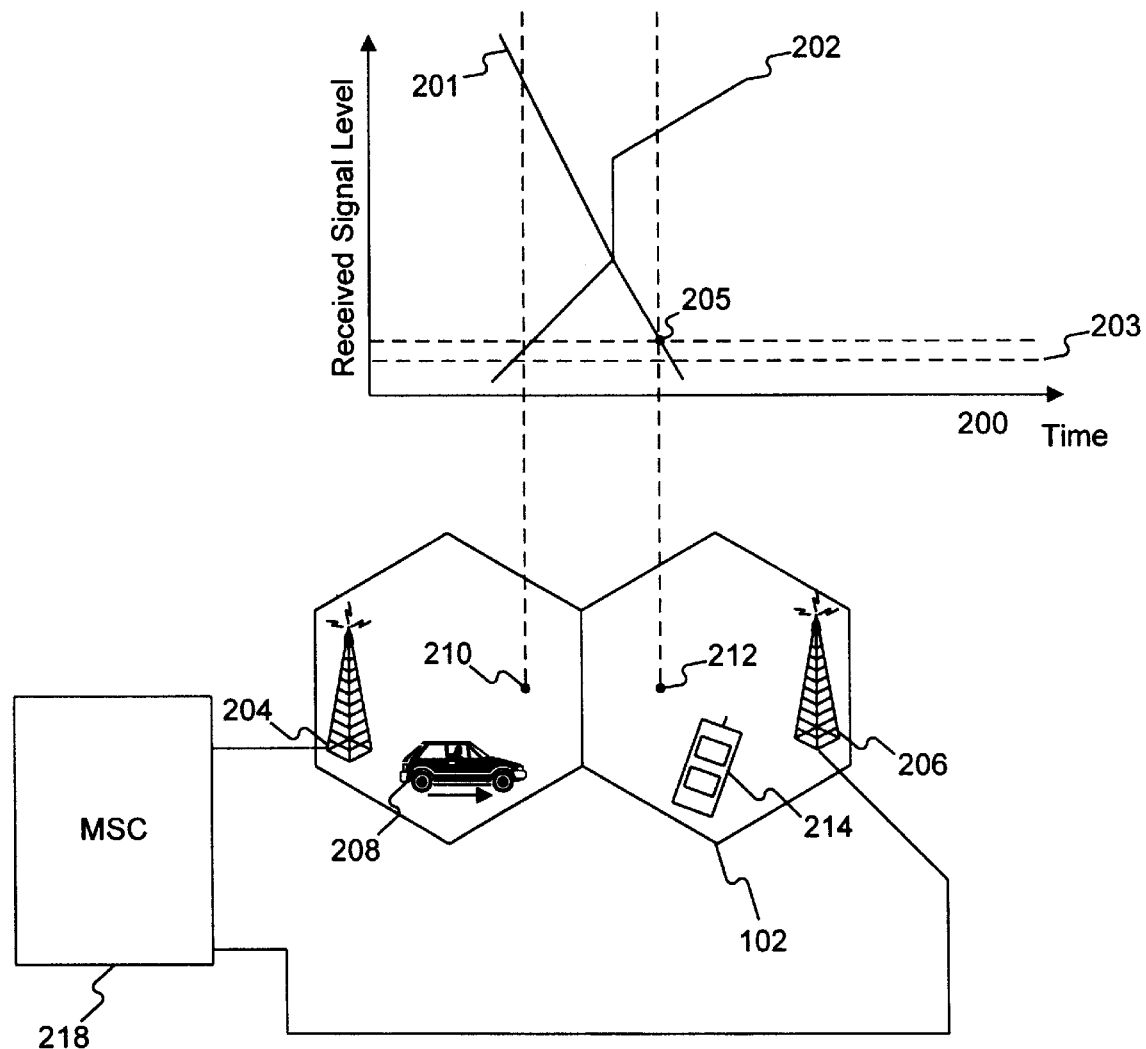
FIG. 2 illustrates a portion of a cellular system that is serviced by a Mobile Switching Center.

Reference will now be made to preferred embodiments of this invention, examples of which are shown in the accompanying drawings and will be obvious from the description of the invention. In the drawings, the same reference numbers represent the same or similar elements in the different drawings whenever possible.

Systems and methods consistent with the present invention allow the efficient treatment of two types of wireless calls, where the treatment for each type of call differs. For purposes of the following description, the systems and methods consistent with the present invention are only described with respect to hand-in and new calls, and with a cellular telephony system having a limited number of channels per base station. The description should also be understood to apply in general for a system which allocates a scarce resource (e.g., number of channels available) to two or more demands (e.g., more than two types of calls). Further, the terms mobile unit and hand-held unit are interchangeable.

Figure 3:
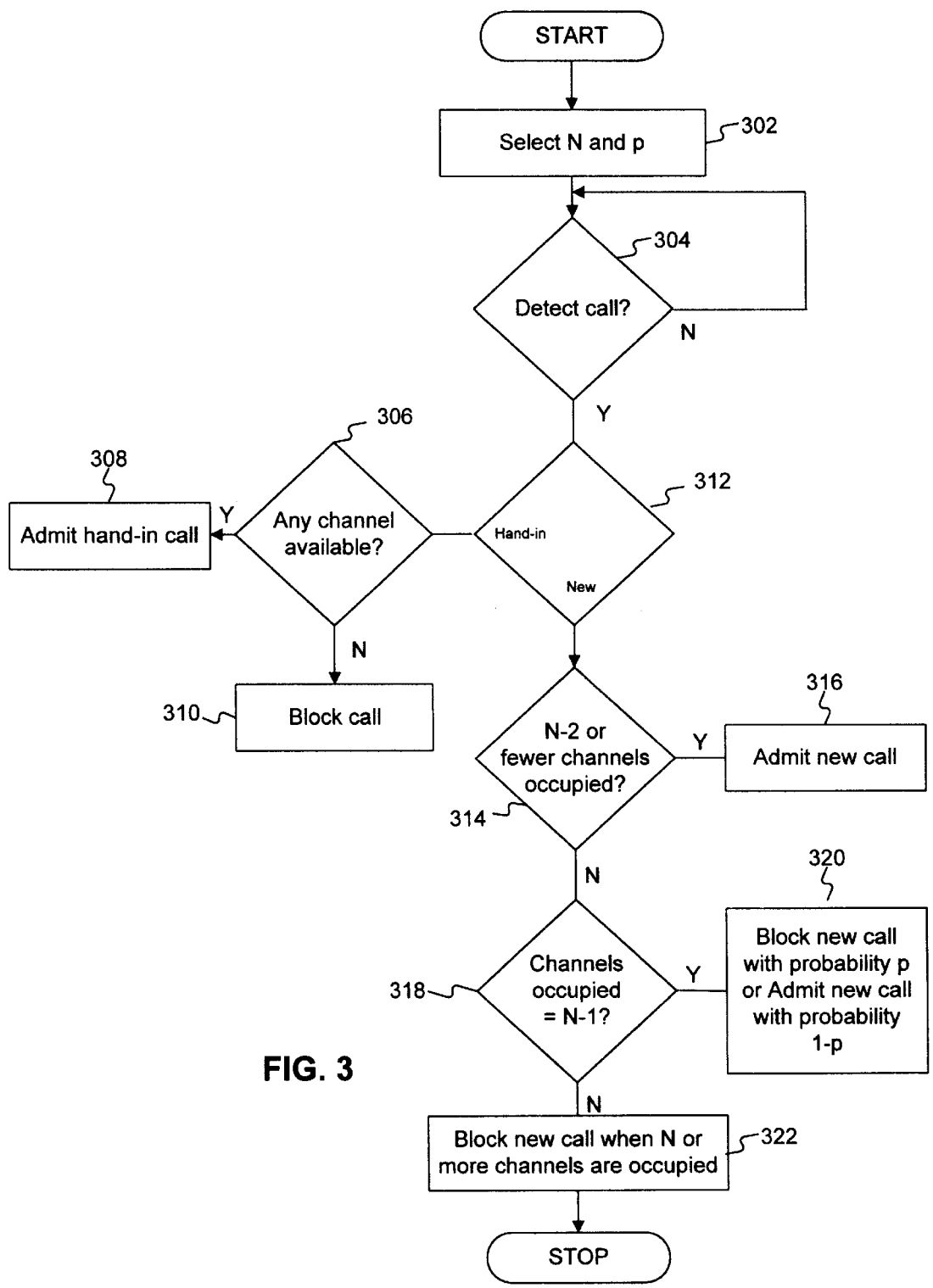
FIG. 3 illustrates a flowchart of one embodiment of the present invention.

An embodiment of the admission control protocol/policy of the present invention is illustrated in FIG. 3. The method is conceivably performed in the MSC 218 when a request for a new channel from base station 206 is made. The first step 302 in the admission control method is to select two parameters, N and p. N is a positive integer number that is less than or equal to the total number of channels assigned to the base station 206. The parameter p is a real number that can assume a value between 0 and 1, possibly including 0 and 1. Step 304 determines whether there is a call requesting a channel. If that is the case, then the system assumes that the call is either a hand-in call or a new call (step 312). In the event that no call request is detected, the process leads back to step 304. In this fashion, the flowchart of FIG. 3 reflects the fact that the MSC 218 is constantly monitoring the arrival of either hand-in or new calls.

If the call is a hand-in call, step 306 determines whether there are any channels (from the total channels assigned to the base station 206) available. If there is an available channel, then the hand-in call is admitted 308. Otherwise, the hand-in call is blocked 310.

In the event that a new call request has been detected, the new call admission protocol is triggered. Step 314 determines whether N−2 or fewer channels (of all of the channels assigned to the base station 206) are occupied. If that is the case, the new call is admitted into the system 316.

If the condition set forth in step 314 is not satisfied, then step 318 determines whether N−1 channels are occupied. If that is indeed the case, then the new call is admitted 320 with a probability 1−p (or not admitted with a probability p). When the condition set forth in step 318 is not met, it is assumed that N or more channels are occupied, and the new call will not be admitted 322.

An important distinction between the present invention and the conventional methods discussed above is that the reserve channels of the present invention are floating reserve channels because even though there is a default number of reserve channels in the present invention, there are no channels designated to be exclusively used as reserve channels. Instead, for purposes of this invention, the number representing the floating reserve channels is what is of relevance.

It is important to note that although the number p represents a probability of a new call not being admitted at the specific instance where the number of busy channels is N−1, the number p is a design parameter that affects the overall blocking probability of new and hand-in calls. That is, the parameter p represents a design parameter, rather than a performance measurement, that can be adjusted to achieve a desired performance or predicted performance (e.g., blocking probability of either new calls or hand-in calls).

For illustrative purposes, FIG. 4 shows the computed results of a comparison made between the first and third conventional methods of admission control discussed above, and the method of the present invention. The main focus is, however, on the comparison between the third and the present methods, since the first method does not prioritize calls depending on the traffic type. The present method is alternatively referred to as the fourth method.

In order to compare the efficiency achieved by the use of the present method with the efficiency achieved by the use of the third method, the test used assumes the same traffic characteristics for both methods (e.g., arrival process, holding time). The test sets a number of total channels (Ntot) common to both systems, sets a number of reserve channels out of Ntot (only for the system implementing the conventional method) and then computes or estimates the blocking probability of hand-in calls and of new calls achieved by the system implementing the third method.

After computing the blocking probability of hand-in calls resulting from use of the third method, the design parameters p and N are varied in the present method in order to obtain a blocking probability of hand-in calls that matches the one produced by the third method.

Once the blocking probability for hand-in calls matches for the two methods, the blocking probabilities for new calls are compared to find out the relative efficiency of the systems implementing the methods. The following discussion with respect to FIG. 4 establishes the clear advantages of the present method.

FIG. 4 shows the results of a mathematical analysis, using Markov chain theory, of the admission control protocols of the first, third and fourth methods. These results can also be computed by other numerical analysis methods or computer simulation. The second method is not disclosed because after performing similar analysis with respect to the second method, it was found that the third method is more efficient than the second method. Consequently, if by comparing the third method with the fourth (present) method it is determined that the fourth method is more efficient, then the fourth method is also more efficient than the second method.

The table of FIG. 4 shows 3 different trials for a number of reserve channels used in the third method. There are two reserve channels. In the table, column 408 represents the hand-in call arrival process expressed in units of number of hand-in calls per minute, while column 416 represents the new call arrival process expressed in units of number of new calls per minute. The arrival processes follow a Poisson process. The significance of these processes for the purposes of the comparison test is just to illustrate that the test assumed the same traffic arrival processes for a given test trial. The call duration, modeled by a service process characterized by a probabilistic exponential distribution, is normalized to one minute for all of the trials.

Each trial represents a different set of test conditions that are common for the methods being tested. The first row (row 421) illustrates the first set of conditions used for performing the performance test. This first set of conditions is common to all the methods being tested. Referring to row 421, the first test trial was performed by assuming that the average number of calls for an arrival process of hand-in calls 418 is 2, that the average number of calls for an arrival process of new calls 416 is 4, and that the total number of channels (Ntot) assigned to a base station 412 is 11. Both the arrival processes and the number of channels are common to first, third and fourth methods.

Referring to row 422, in a second trial of the performance test the set of conditions changes to an average number of calls in an arrival process of hand-in calls 418 of 5, an average number of calls in an arrival process of new calls 416 of 10, and a total number of channels of 18. In the third trial (row 423) both call averages in the arrival processes (418 and 416) keep the same values set during the second trial, but the number of total channels 412 assumes a value of 21. In essence, the total number of channels 412 assumes a different value for each of the trials.

The condition set forth above that the blocking probability of the third and fourth method must match in order to perform the test is reflected in column 410. Again, the blocking probability for a hand-in call (as well as for a new call) in the third method depends on the number of reserve channels. The values N and p are adjusted in the system implementing the fourth method in order to achieve a hand-in blocking probability value that is the same as the hand-in blocking probability value computed by modeling the third method. The values for N and p are shown in the columns labeled 404 and 402 respectively. Once this is done, we compare the blocking probability values for new calls corresponding to the third method (column 408) with the blocking probability values for new calls corresponding to the fourth method (column 406). N and p assume a different value for each of the trials 421, 422, and 423.

Considering the first line in the table, the total number of channels assigned to the base station of interest is found under column 412 and assumes a value of 11. Referring to column 410, the blocking probability of hand-in calls under the third and fourth admission control methods is 0.60%. That is, in the test represented by FIG. 4 the hand-in blocking probability is the same for the third and fourth methods.

Referring to column 408, the new call blocking probability achieved under the third method is 7.51%. When comparing this result with that of column 406, we note that the new call blocking probability achieved under the fourth method is 6.48%. That is, the user of a cellular telephony system implementing the third method is 1.16 times more likely to receive a blocked call message than a user of a system implementing the fourth method when trying to make a telephone call.

Referring to columns 404 and 402, the values of N and p are 10 and 0.358 respectively. Thus, by choosing a value of p=0.358 and N=10, the method disclosed in FIG. 3 will perform better than the third method with regards to the blocking probability of new calls, and will achieve the same performance with regards to the blocking probability of hand-in calls.

Note that the calculated blocking probabilities presented in column 400 are the same for new and hand-in calls, which implies that the blocking probabilities for new versus hand-in calls do not depend on the number of reserve channels. This situation is not surprising, since they correspond to the first method of admission control discussed in the Background section, which does not prioritize calls. This blocking probability assumes a value of 2.3%, which is less than the blocking probability of new calls in the fourth method (406), but higher than the hand-in blocking probability 410. Still, because the purpose of the present system design is to give priority to calls of a first type, method one fails to meet the requirements of the system, and hence is only relevant for purposes of test completion.

Although only one test trial was discussed when comparing the results of the different models, the same discussion applies for the other test trials. In essence, our results show that the fourth method always performs with an efficiency higher than that of the third method. At this time it is uncertain, however, whether one can guarantee the exact gain margin in the efficiency of the fourth method over the third method. Moreover, the parameters N and p were determined in a very particular manner with respect to the performance of the third model. This does not preclude alternative methods for determining such parameters. The novel feature consists in that designers now have more flexibility in varying system parameters in order to achieve a desired performance, by being able to choose parameters N and p.

Further, although the description of the invention is concerned with two types of traffic, new and hand-in, the invention also applies to more than two classes of traffic. One such approach would be to admit type i traffic if the number of occupied channels is less than $N_i-2$, admit type i channel with probability $P_i$ if the number of occupied channels is $N_i-1$, and reject the type i traffic if the number of occupied channels is $N_i$ or more. In such a protocol one would expect, but not insist, that $N_1 > N_2 \ldots > N_k$ (k is the number of classes to be prioritized), if the class 1 refers to the least critical traffic type, type 2 refers to the second least critical traffic type, and type k to the most critical traffic type (higher priority). Whereas the disclosure was concerned with the admission control for wireless calls to a sector of a cell site, the invention can be more generally applied to the allocation of a scarce resource to two or more demands.

Furthermore, the values of N and p may be adjusted dynamically depending on a desired level of performance (e.g., blocking probability of hand-in calls). That is, the QOS of a cellular system may be monitored, and as the QOS varies, the values of N and p may be dynamically adjusted to produce a desired QOS.

Although the systems and methods described above refer to the selection of two parameters N and p, equivalent embodiments may use a set of probabilities $p_j$ to accomplish the same result. In these embodiments a hand-in call would always be admitted when there is a channel available. But when a new call arrives, the number N does not play a role in the admissibility of such call. Instead, the new call may be admitted with a probability p in the set $p_j$. The set $p_j$ may include a number of probabilities that is the same as the number of channels available. A particular probability would be used in determining the admission of a new call. This particular probability may depend on the number of non-busy channels in a base station.

The foregoing description of preferred embodiments of the present invention provides an exemplary illustration and description, but is not intended to be exhaustive or to limit the invention to the precise form disclosed. Modifications and variations are possible in light of the above teachings or may be acquired from practice of the invention.

What is claimed is:

1. A method for controlling the admission of a call into a service area, comprising the steps of:
    selecting a non-negative number N, where N is greater than one, based on a desired quality of service;
    selecting a number p, lying between 0 and 1 and possibly including 0 and 1, based on a desired quality of service;
    admitting a call when N−2 or fewer channels are occupied;
    blocking the call with a probability p when N−1 channels are occupied; and
    blocking the call when N or more channels are occupied.

2. The method of claim 1, wherein the step of selecting a non-negative integer comprises:
    determining a total number of channels corresponding to the service area;
    identifying a number of reserve channels from said total number of channels; and
    subtracting the number of reserve channels from the total number of channels, the result of the subtraction being the integer N.

3. The method of claim 1, further comprising:
    admitting the call with a probability 1−p when N−1 channels are occupied.

4. The method of claim 1, wherein the call is a hand-in call.

5. The method of claim 1, wherein the call is a new call.

6. The method of claim 1, wherein the value of N depends on a level of priority of the call.

7. A method for controlling the admission of calls into a service area, comprising the steps of:
   selecting a non-negative integer N, wherein N is greater than one, based on a desired quality of service;
   selecting a number p, lying between 0 and 1 and possibly including 0 and 1, based on a desired quality of service;
   admitting a first-type call when N−2 or fewer channels are occupied;
   blocking the first-type call with a probability p when N−1 channels are occupied;
   blocking the first-type call when N or more channels are occupied; and
   admitting a second-type call when there are any available channels.

8. The method of claim 7, wherein the step of selecting a non-negative integer comprises:
   determining a total number of channels corresponding to the service area;
   identifying a number of reserve channels from said total number of channels; and
   subtracting the number of reserve channels from the total number of channels, the result of the subtraction being the integer N.

9. The method of claim 7, further comprising:
   admitting the first-type call with a probability 1−p when N−1 channels are occupied.

10. The method of claim 7, wherein the first-type call is a new call.

11. The method of claim 7, wherein the second-type call is a hand-in call.

12. A system for controlling the admission of a call into a service area, comprising:
   means for selecting a non-negative integer N, wherein is greater than one, based on a desired quality of service;
   means for selecting a number p, lying between 0 and 1 and possibly including 0 and 1, based on a desired quality of service;
   means for admitting a call when N−2 or fewer channels are occupied;
   means for blocking the call with a probability p when N−1 channels are occupied; and
   means for blocking the call when N or more channels are occupied.

13. The system of claim 12, wherein the means for selecting a non-negative integer comprises:
   means for determining a total number of channels corresponding to the service area;
   means for identifying a number of reserve channels from said total number of channels; and
   means for subtracting the number of reserve channels from the total number of channels, the result of the subtraction being the integer N.

14. The system of claim 12, further comprising:
   means for admitting the call with a probability 1−p when N−1 channels are occupied.

15. The system of claim 12, wherein the call is a hand-in call.

16. The system of claim 12, wherein the call is a new call.

17. The system of claim 12, wherein the value of N depends on a level of priority of the call.

18. A system for controlling the admission of calls into a service area, comprising:
   means for selecting a non-negative number N, wherein N is greater than one, based on a desired quality of service;
   means for selecting a number p, lying between 0 and 1 and possibly including 0 and 1, based on a desired quality of service;
   means for admitting a first-type call when N−2 or fewer channels are occupied;
   means for blocking the first-type call with a probability p when N−1 channels are occupied;
   means for blocking the first-type call when N or more channels are occupied; and
   means for admitting a second-type call when there are any available channels.

19. The system of claim 18, wherein the means for selecting a non-negative integer comprises:
   means for determining a total number of channels corresponding to the service area;
   means for identifying a number of reserve channels from said total number of channels; and
   means for subtracting the number of reserve channels from the total number of channels, the result of the subtraction being the integer N.

20. The system of claim 18, further comprising:
   means for admitting the first-type call with a probability 1−p when N−1 channels are occupied.

21. The system of claim 18, wherein the first-type call is a new call.

22. The system of claim 18, wherein the second-type call is a hand-in call.

23. A method for allocating scarce resources to two or more demands comprising the steps of:
   selecting a non-negative integer N, where N is greater than one, based on a desired quality of service;
   selecting a number p, lying between 0 and 1 and possibly including 0 and 1, based on a desired quality of service;
   allocating a resource to a demand when N−2 or fewer resources are allocated to other demands;
   denying the allocation of a resource to the demand with a probability p when N−1 resources are allocated to other demands; and
   denying the allocation of a resource to the demand when N or more resources are allocated to other demands.

24. The method of claim 23, further comprising:
   allocating a resource to the demand with a probability 1−p when N−1 resources are allocated to other demands.

25. The method of claim 23, wherein the value of N depends on a level of priority of the demand.

26. A method for allocating scarce resources to two or more demands comprising the steps of:
   selecting a non-negative integer N, where N is greater than one, based on a desired quality of service;
   selecting a number p, lying between 0 and 1 and possibly including 0 and 1, based on a desired quality of service;
   allocating a resource to a demand when N−2 or fewer resources are allocated to other demands;
   allocating a resource to the demand with a probability 1−p when N−1 resources are allocated to other demands; and
   denying the allocation of a resource to the demand when N or more resources are allocated to other demands.

27. The method of claim 26, further comprising:
   denying the allocation of a resource to the demand with a probability p when N−1 resources are allocated to other demands.

28. The method of claim 26, wherein the value of N depends on a level of priority of the demand.

29. The method of claim 26, wherein the value of N and the value of p vary dynamically based on a quality of performance.

* * * * *